July 13, 1954    W. E. LEWIS    2,683,351
REVERSIBLE ROTARY HYDRAULIC COUPLING
Filed Aug. 7, 1952    3 Sheets-Sheet 1

Warren E. Lewis
INVENTOR.

BY *Clarence A. O'Brien*
*and Harvey B. Jacobson*
Attorneys

July 13, 1954  W. E. LEWIS  2,683,351
REVERSIBLE ROTARY HYDRAULIC COUPLING
Filed Aug. 7, 1952  3 Sheets-Sheet 2

Warren E. Lewis
INVENTOR.

BY *Lawrence A. O'Brien*
*and Harvey B. Jacobson*
Attorneys

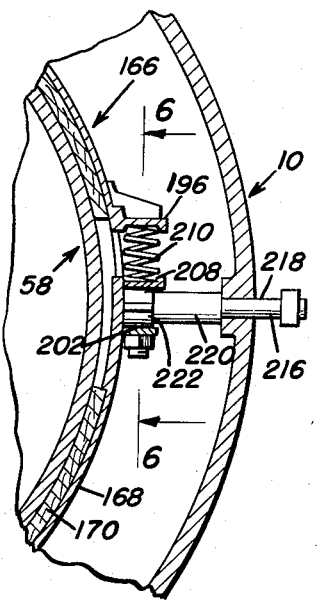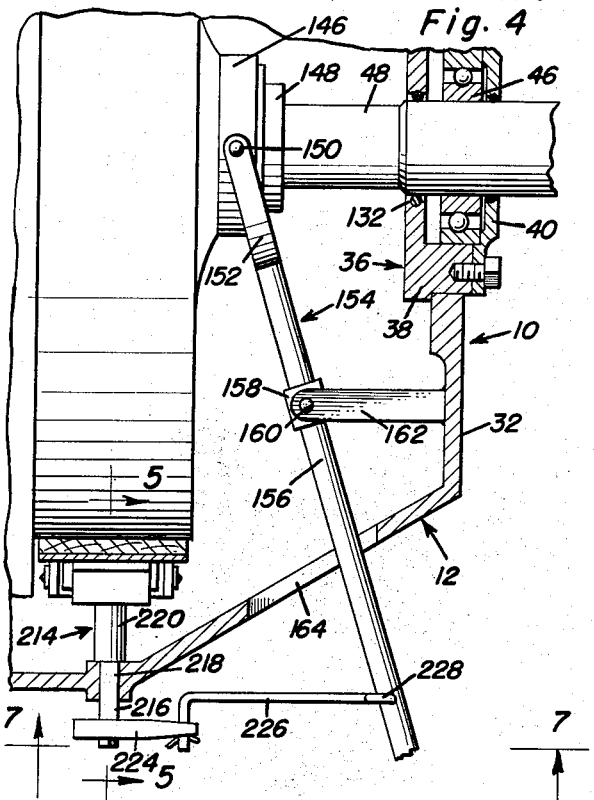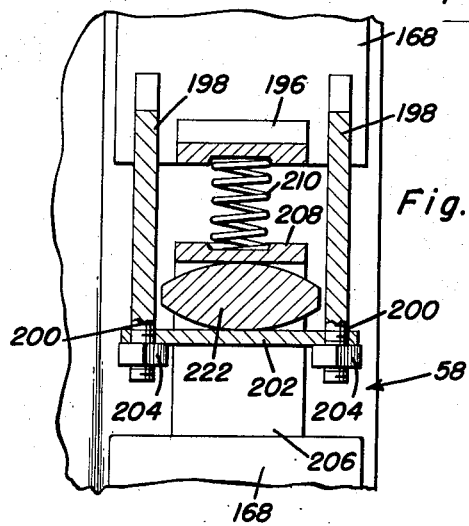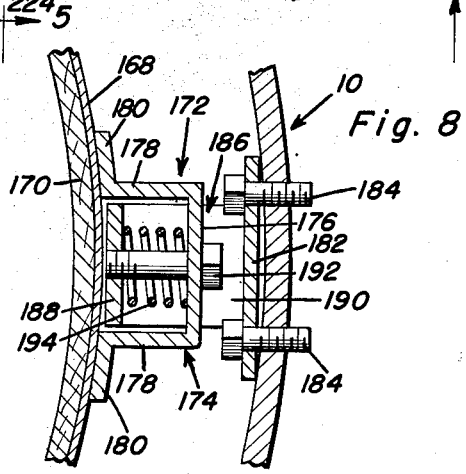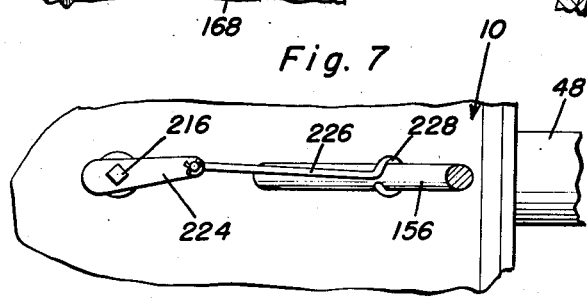

Patented July 13, 1954

2,683,351

UNITED STATES PATENT OFFICE 2,683,351

REVERSIBLE ROTARY HYDRAULIC COUPLING

Warren E. Lewis, Kankakee, Ill.

Application August 7, 1952, Serial No. 303,090

5 Claims. (Cl. 60—54)

This invention relates in general to improvements in fluid transmissions and is an improvement on the fluid transmission set forth in my co-pending application, Serial No. 167,604, filed June 12, 1950.

The primary object of this invention is to provide an improved fluid transmission which includes a shiftable turbine member whereby the speed and power of the turbine member may be varied as desired with respect to a drive impeller of the transmission.

Another object of this invention is to provide an improved fluid transmission which may be connected between a power source and a drive shaft to provide a vibrationless flow of power through controllable hydraulic means with means for selectively reversing the flow of power and varying the speed and power of the unit as desired.

Another object of this invention is to provide an improved fluid transmission which is of a relatively simple and compact design whereby the same may be utilized as a replacement for existing fluid transmissions of vehicles now on the market.

A further object of this invention is to provide an improved fluid transmission which includes a rotating reversing vane for selectively reversing the flow of hydraulic fluid of the transmission whereby the direction of rotation of a turbine member may be selectively reversed, said reversing vane being mounted for independent rotation and being provided with brake means for actively engaging the same.

A still further object of this invention is to provide improved control means for a fluid transmission, said control means including a shift mechanism for axially shifting a turbine member for moving the same from a forward drive position to a reverse drive position, and brake means for selectively positioning a reversing vane for cooperation with said turbine member.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 4 is a fragmentary horizontal sectional view taken through the rear portion of the fluid transmission of Figure 1 substantially along the section line 4—4 and shows the general construction of means for controlling the direction of rotation of the driven shaft by the fluid transmission;

Figure 5 is a fragmentary transverse vertical sectional view taken substantially upon the plane indicated by the section line 5—5 of Figure 4 and shows the means for controlling movement of brake drums adapted to lock the reversing vane of the fluid transmission in a stationary position;

Figure 6 is an enlarged fragmentary longitudinal vertical sectional view taken substantially upon the plane indicated by the section line 6—6 of Figure 5 and shows the general construction of cam means for actuating the brake bands of the brake;

Figure 7 is a fragmentary transverse vertical sectional view taken substantially upon the plane indicated by the section line 7—7 of Figure 4 and shows the connection between a shift yoke and a brake control arm; and Figure 8 is an enlarged fragmentary vertical sectional view showing the manner in which the brake bands are adjustably mounted.

Similar characters of reference designate similar or identical elements and portions throughout the specification and throughout the different views of the drawings.

Figure 1:
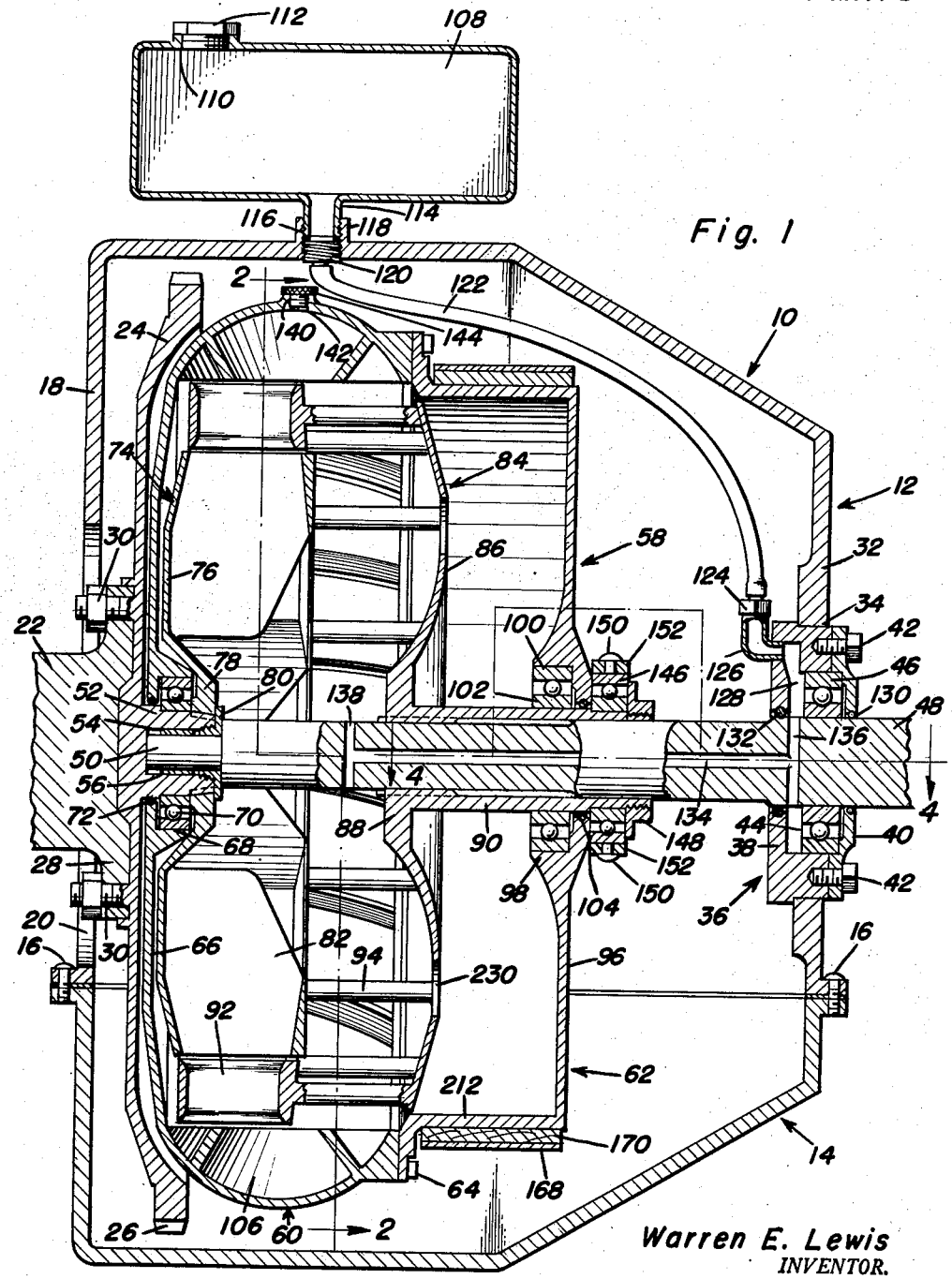
Figure 1 is a longitudinal vertical sectional view taken through the center of the fluid transmission which is the subject of this invention and shows the general construction thereof, the fluid transmission being in a position for forward drive.
Figure 2:
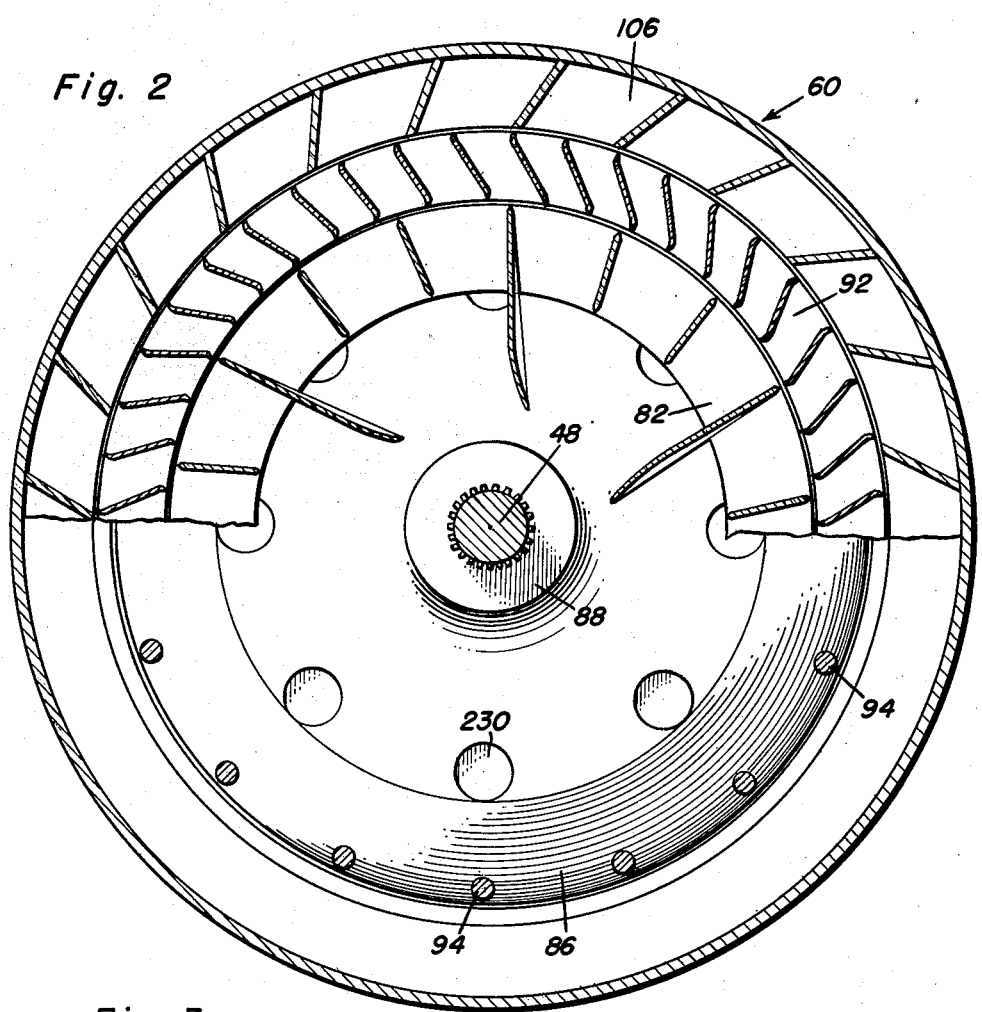
Figure 2 is a fragmentary transverse vertical sectional view taken substantially upon the plane indicated by the section line 2—2 of Figure 1 and shows the general construction of the blading of the transmission.
Figure 3:
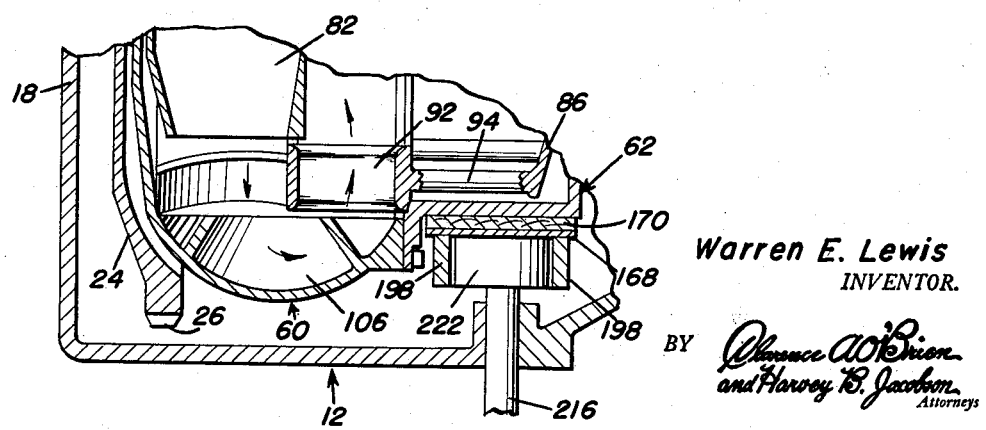
Figure 3 is a fragmentary longitudinal horizontal sectional view similar to Figure 2 and shows the arrangement of the vanes when the transmission is in position for reverse rotation.

Referring now to the drawings in particular, it will be seen that there is illustrated in Figure 1 the general construction of the fluid transmission, which is the subject of this invention, the fluid transmission including an outer supporting housing which is referred to in general by the reference numeral 10. The supporting housing 10 is adapted to be secured at its forward end to the rear end of a power unit (not shown) and is partially supported thereby. The supporting housing 10 includes an upper half, which is referred to in general by the reference numeral 12 and a lower half, which is referred to in general by the reference numeral 14, the halves being connected together along a horizontal plane by suitable fastening means 16. The lower half 14 is removable from the upper half 12 in order that access to the interior of the supporting housing 10 may be obtained for repairing and adjusting the fluid transmission.

The upper half 12 includes a vertical front wall 18 which has an enlarged circular opening 20 therethrough, the opening 20 receiving the rear end of a crank shaft 22 of the power unit (not shown).

Secured to the rear end of the crank shaft 22 for rotation therewith is a fly wheel 24 having starter engaging teeth 26 around the circumference thereof. The fly wheel 24 is secured to a flange 28 on the rear end of the crank shaft 22 by suitable fasteners 30.

The upper half 12 of the supporting housing 10 also includes a rear wall 32 which is in spaced parallel relation to the front wall 18. The rear wall 32 is provided with a circular opening 34 in alignment with the circular opening 20 and in which is mounted a two-piece bearing housing which is referred to in general by the reference numeral 36. The bearing housing 36 includes a forward bearing case 38 which is locked in the opening 34, and a bearing cap 40 which is removably connected to the bearing case 38 at the rear end thereof by suitable fasteners 42.

The bearing case 38 is provided with a rearwardly open bearing receiving recess 44 in which is positioned a suitable bearing 46. The bearing 46 is retained within the bearing receiving recess 44 by the bearing cap 40 and has rotatably supported therein a driven shaft 48. The driven shaft 48 extends both forward and rearwardly through the bearing 46 and is provided with a reduced forward end 50 which is rotatably supported within a rearwardly extending centrally located boss 52 on the fly wheel 24. The boss 52 is provided with a centrally located bore in which is mounted a pilot bearing 56, the pilot bearing 56 being in supporting engagement with the reduced forward end 50 of the driven shaft 48.

Mounted on both the boss 52 and the driven shaft 48 for independent rotation is a two-piece casing which is referred to in general by the reference numeral 58. The casing 58 includes a forward reversing vane portion, which is referred to in general by the reference numeral 60, and a rear cover portion, which is referred to in general by the reference numeral 62. The cover portion 62 is connected to the rear edge of the reversing vane portion 60 by suitable fasteners 64 in order that access to the interior of the casing 58 may be readily attained.

It will be noted that the reversing vane portion 60 includes a front wall 66 which has a rearwardly projecting hub 68. The hub 68 has a bearing receiving recess in the rear face thereof in which is mounted a suitable bearing 70. The bearing 70 is mounted for rotation on the boss 52 of the fly wheel 24, and supports the forward end of the casing 58. The front wall 66 of the reversing vane portion 60 is also sealed to the boss 52 by a sealing ring 72.

Positioned within the reversing vane portion 60 for rotation with the fly wheel 24 and crank shaft 22 is a drive impeller which is referred to in general by the reference numeral 74. The drive impeller 74 includes a generally circular supporting plate 76 which has a rearwardly offset central portion 78. The central portion 78 is splined to the boss 52 and retained in splined engagement by a locking element 80 threadedly engaged within the boss 52. The drive impeller 74 also includes a rearwardly extending impeller vane ring 82 which is connected at the outer circumferential edge of the supporting plate 74.

Also mounted within the casing 58 for rotation is a turbine member, which is referred to in general by the reference numeral 84. The turbine member 84 includes a backing plate of similar configuration to the backing plate 74, the backing plate being referred to in general by the reference numeral 86 and having a forwardly extending central hub portion 88. The hub portion has integral therewith a rearwardly extending sleeve 90 which is splined to the driven shaft 48 for sliding movement therealong.

The turbine member 84 also includes a vane ring 92 which is positioned forwardly of the supporting plate 86 and is of a circumference greater than the outer circumference of the impeller vane ring 82. The turbine vane ring 92 is adapted to be positioned concentrically of the impeller ring 82, as is best illustrated in Figure 1, and is secured to the backing plate 86 by a plurality of circumferentially spaced connecting rods 94, the rear ends of the connecting rod 94 being rigidly connected to the backing plate 86.

It will be noted that the cover portion 62 of the casing 58 also includes a rear wall 96 which has an enlarged hub portion 98. The hub portion 98 is provided with a centrally located forwardly open bearing receiving recess 100 in which is mounted a suitable bearing 102. The bearing 102 also engages the outer surface of the sleeve 90 and supports the rear portion of the casing 58. The hub 98 also includes a seal ring 104 which is in engagement with the outer surface of the sleeve 90 for sealing the rear end of the casing 58 against escape of hydraulic fluid.

It will be noted that the reversing vane portion 60 also includes a reversing vane ring 106 integral with the interior thereof. The reversing vane ring 106 has an inner circumference substantially equal to the outer circumference of the vane ring 92 and is positioned closely adjacent the same. The reversing vane ring 60 is intended to reverse the direction of flow of hydraulic fluid driven by the impeller ring 82 in order that the direction of rotation of the turbine member 84 may be selectively reversed.

Referring once again to Figure 1, it will be seen that mounted on the top surface of the supporting housing 10 is an oil reservoir 108. The oil reservoir 108 includes a filling opening 110 which is normally closed by removable closure cap 112 and is intended for convenient replacement of oil. The lower end of the oil reservoir 108 includes a tubular projection 114 which is externally threaded and is threadedly engaged in an internally threaded bore 116 of an upwardly projecting boss 118 on the outer surface of the supporting housing 10.

Also threadedly engaged in the threaded bore 116 is a fitting 120 to which is connected a top end of a flexible tubing 122. The lower end of the flexible tubing 122 is connected to a second fitting 124 disclosed within the interior of the supporting housing 10 and connected to an L-shaped fitting 126. The L-shaped fitting 126 is carried by the forward wall of the bearing case 38 and communicates with a circular oil passage 128 therein. The oil passage 128 communicates with the bearing receiving recess 44 and hydraulic fluid from the reservoir 108 lubricates the bearing 46. In order that hydraulic fluid may not escape from the bearing receiving recess 44, the bearing cap 40 is provided with a centrally located sealing ring 130 which engages the driven shaft 48 in sealing relation at the rear end of the bearing 46. The bearing case 38 is also sealed against escape of hydraulic fluid by a sealing ring 132 which also engages the driven shaft 48.

It will be noted that the driven shaft 48 is provided with an axial bore 134 whose rear end communicates with a transverse bore 136. The transverse bore 136 is in alignment with the circular oil passage 128 and is adapted to receive oil from the oil reservoir 108. The forward end of the bore 134 is positioned within the casing 58 between the drive impeller 74 and the driven impeller 84 and communicates with the interior of the casing 58 by a transversely extending bore 138.

In view of the foregoing, it will be readily seen that the casing 58 may be filled with hydraulic fluid at all times due to the filling action of the reservoir 108. In order that the casing 58 may be also conveniently filled and drained, the reversing vane portion 60 is provided with an outwardly projecting boss 140. The boss 140 is provided with an internally threaded bore 142 which is normally closed by a closure element 144.

Referring now to Figures 1 and 4, it is seen that there is provided shift means for shifting the turbine member 84 longitudinally of the driven shaft 48. The shaft means includes a throw out bearing 146 which is mounted on the rear end of the sleeve 90 and secured thereto by a locking element 148. Pivotally connected to the outer race of the bearing 146 by suitable connecting elements 150 are bifurcated end portions 152 of a shifting yoke, which is referred to in general by the reference numeral 154.

The shifting yoke 154 includes an elongated shaft portion 156 which has mounted thereon intermediate its ends a sleeve 158. Pivotally connected to the sleeve 158 by suitable connecting means 160 is a pair of support arms 162. The rear ends of the support arms 162 are rigidly connected to the front base of the rear wall 32 of the supporting housing 10, the supporting arms 164 forming a fulcrum for the shifting yoke 154.

It will be noted that the shaft 156 extends through an elongated slot 164 in the wall of the upper half 12 of the supporting housing 10 and is provided with a conventional pedal assembly (not shown) for moving the same.

It will be seen that when the outer end of the shaft 156 is moved forwardly the central portion thereof pivots about the connecting means 160 with the result that the bifurcated inner end of the shift yoke 154 is moved rearwardly with the resultant rearward movement of the turbine member 84.

It will be understood that for certain stages of the hydraulic transmission, which is the subject of this invention, it is desired that the reversing vane ring 106 remains stationary. In order that the reversing vane ring 106 remains stationary, the casing 58 must be locked against rotation within the supporting housing 10. In order that the casing 58 may be selectively locked against rotation, the fluid transmission also includes a brake mechanism which is referred to in general by the reference numeral 166. The brake mechanism 166 includes a substantially annular brake ring 168 which has secured to the inner surface thereof a substantially circular brake lining 170. As is best illustrated in Figure 8, the brake ring 168 is supported from the supporting housing 10 by a supporting structure which is referred to in general by the reference numeral 172. The supporting structure 172 includes a channel element which is referred to in general by the reference numeral 174 connected to the outer surface of the brake ring 168. The channel element 174 includes a web 176 which has integral therewith a pair of inwardly directed flanges 178. The flanges 178 terminate in upwardly and downwardly wing flanges 180. The wing flanges 180 are rigidly secured to the outer surface of the brake ring 168.

The supporting structure 172 also includes a plate 182 which is connected to the inner surface of the supporting housing 10 by suitable fasteners 184. Rigidly carried by the plate 182 is a second channel element which is referred to in general by the reference numeral 186. The channel element 186 includes a web 188 which extends transversely of the web 176 and is positioned between the flanges 178 of the channel element 174. Integral with the web 188 are outwardly extending spaced parallel flanges 190 whose outer ends are connected to the plate 182. It will be noted that the flanges 190 are disposed on opposite sides of the web 176 so that the channel element 174 is prevented from shifting both longitudinally and circumferentially.

Carried by the web 176 and having its end threadedly engaged in the web 188 is an adjusting member 192. Carried by the adjusting member 192 and disposed between the webs 176 and 188 is a coil spring 194 for maintaining an adjustment set by the adjusting member 192.

It will be readily understood that there are a plurality of supporting constructions 172 spaced circumferentially about the brake ring 168. It will also be understood that the supporting constructions 172 may be easily reached either through special hand holes (not shown) in the supporting housing 10 or by removing the lower half 14.

Referring now to Figures 5 and 6 in particular, it will be seen that the ends of the brake ring 168 are in spaced relation. Secured to the upper end thereof is an outwardly extending L-shaped member 196 which is of a lesser width than the brake ring 168 and positioned centrally thereof. Also secured to the upper end of the brake ring 168 and projecting outwardly therefrom is a pair of spaced parallel connecting members 198. The connecting members 198 extend downwardly from the upper end of the brake ring 168 on opposite sides of the L-shaped member 196 and is provided with lower threaded stud portions 200. Adjustably mounted on the lower threaded stud portions 200 and extending therebetween is a plate 202, the plate 202 being retained on the threaded stud portions 200 by a suitable nut element 204.

The lower end of the brake ring 168 is of a reduced width and is referred to by the reference numeral 206. The lower end 206 terminates in an outwardly directed flange 208 which is in spaced parallel relation to an outwardly projecting portion of the L-shaped member 196. Extending between and mounted in a socket in the L-shaped element 196 and the flange 208 is a spring 210 which urges the ends of the brake ring 168 apart.

It will be noted that the brake ring 168 is mounted around a cylindrical drum portion 212 of the cover portion 62 and the brake lining 170 lies closely adjacent the same when the ends of the brake rings 170 are in their spaced positions.

In order that the ends of the brake ring 168 may be urged together, the brake mechanism 166 also includes an actuating mechanism which is referred to in general by the reference numeral 214. The actuating mechanism 214 includes a shaft 216 which passes through a bore 218 in the side wall of the supporting housing 10 and is supported thereby. The shaft 216 has an enlarged inner portion 220 which is integral with a cam element 222 at the inner end thereof.

Referring now to Figure 6 in particular, it will be seen that the cam 222 is disposed between the flange 208 and the plate 202 and that rotation of the same will urge the flange 208 away from the plate 202. Movement of the flange 208 away from the plate 202 results in the movement of the same towards the L-shaped member 196 with the resultant compressing of the spring 210 and the tightening of the brake band 170 against the brake drum portion 212 of the cover portion 62.

Referring now to Figures 4 and 7 in particular, it will be seen that the outer end of the shaft 216 has connected thereto for rotation therewith a shift arm 224. The shift arm 224 has pivotally connected thereto one end of an L-shaped link 226. The other end of the L-shaped link 226 is connected to the shaft 156 by a ring portion 228. When the shaft 156 is moved forwardly to shift the turbine member 84, the shaft 216 is rotated with the resultant clamping of the drum portion 212 by the brake band 170. The clamping of the drum portion 212 results in the locking of the casing 58 against rotation during the movement of the turbine member 84. Although the link 226 has been illustrated and described as being connected to the shaft 156 for actuation thereby, separate actuating means for the link 226 to permit independent operation of the brake mechanism 166 may be provided.

Referring now to Figure 1 in particular, it will be seen that the impeller and turbine vane rings of the fluid transmission are in their forward drive position. When in such a position, the turbine vane ring 92 is in vertical alignment and concentric with the drive impeller ring 82. As the drive impeller ring 82 is rotated hydraulic fluid driven by the same strikes the turbine vane ring 92 with the resultant rotation of the turbine member 84 and the rotation of the driven shaft 48. Hydraulic fluid passing beyond the turbine vane ring 92 engages the reversing vane ring 106 which reverses the direction of flow of the hydraulic fluid and returns the same towards the center of the mechanism. When so positioned, the reversing vane ring 106 is free to rotate and the fly wheel 24, the drive impeller 74, the turbine member 84, the driven shaft and the casing 58 rotate forwardly.

It will be seen that as the turbine vane ring 92 is moved rearwardly with respect to the impeller vane ring 82 the force exerted thereon by the impeller vane ring 82 becomes neutralized by the reverse flow of hydraulic fluid directed by the reversing vane ring 106 with the result that when the turbine vane ring 92 is in an intermediate position, no rotary force is exerted thereon and the fluid transmission may be considered to be in neutral. If necessary, the brake mechanism 166 could be actuated to prevent rotation of the reversing vane ring 106.

The arrangement of the vanes gives the drive impeller the advantage of the turbine member inasmuch as it has a smaller pulling radius. In order that more power may be obtained and the turbine member 84 be driven at a lower rate, the brake mechanism 166 may be actuated and the casing 58 locked against rotation. The locking of the casing 58 against rotation results in the stationary positioning of the reversing vane ring 106. As the hydraulic fluid circulates through the reversing vane ring and back into the drive impeller, the reversing vane ring 106 becomes a reactor and increases the torque and reduces the speed of the turbine member 84.

When it is desired to rotate the driven shaft 48 and the turbine member 84 in reverse directions, the turbine member 84 is moved rearwardly by utilizing the control mechanism 154. When the turbine member 84 is retained in such a position, the reversing vane ring 106 is locked against rotation with the result that hydraulic fluid driven by the drive impeller 74 has its direction of flow reversed before striking the turbine vane ring 92 and results in a reverse rotation of the turbine member 84. It will be noted that the support plate 86 of the turbine member 84 is provided with a plurality of circumferentially spaced openings 230 to permit flow of hydraulic fluid therethrough during the shifting operation.

The fluid transmission, which is the subject of this invention, when intended for use in an automobile has a forward and reverse pulling torque which is substantially equal to each other and is equivalent to a normal second gear. Therefore, a low gear would be necessary for hard pulling, which can be placed in the conventional position, and can be engaged when the fluid transmission is in a neutral position. This arrangement would also give a two speed reverse.

The fluid transmission, which is the subject of this invention, also a variable speed control, which is accomplished by shifting the turbine member 84 with respect to the drive impeller 74, and would also be good for industrial use. By so shifting the turbine member 84, the fluid transmission could be used to give any speed from the constant speed of a power unit to zero and then to a reverse speed up to about one-third of the speed of the power unit. This accomplished by both adjusting the position of the turbine member and the use of the brake mechanism.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A reversible rotary hydraulic coupling comprising axially fixed drive and driven shafts mounted for rotation relative to each other, an impeller carried by said drive shaft for rotation therewith, a turbine member carried by said driven shaft for rotation therewith, a casing surrounding said impeller and said turbine member, a reversing vane ring carried by said casing for reversing the direction of flow of fluid circulated by said impeller, said turbine member being mounted for axial movement and including a vane ring selectively positionable in the path of fluid flowing between said impeller and said reversing vane ring and fluid flowing between said reversing vane ring and said impeller to selectively control the direction of rotation of said driven shaft.

2. A reversible rotary hydraulic coupling comprising axially fixed drive and driven shafts mounted for rotation relative to each other, an impeller carried by said drive shaft for rotation therewith, a turbine member carried by said driven shaft for rotation therewith, a casing surrounding said impeller and said turbine member, a reversing vane ring carried by said casing for reversing the direction of flow of fluid circulated by said impeller, said turbine member being mounted for axial movement and including a vane ring selectively positionable in the path of fluid flowing between said impeller and said reversing vane ring and fluid flowing between said reversing vane ring and said impeller to selectively control the direction of rotation of said driven shaft, the vane ring of said turbine member being carried by a support plate in spaced relation thereto, movement of said support plate varying the effective volume of the fluid flow portion of said casing.

3. A reversible rotary hydraulic coupling comprising axially fixed drive and driven shafts mounted for rotation relative to each other, an impeller carried by said drive shaft for rotation therewith, a turbine member carried by said driven shaft for rotation therewith, a casing surrounding said impeller and said turbine member, a reversing vane ring carried by said casing for reversing the direction of flow of fluid circulated by said impeller, said turbine member being mounted for axial movement and including a vane ring selectively positionable in the path of fluid flowing between said impeller and said reversing vane ring and fluid flowing between said reversing vane ring and said impeller to selectively control the direction of rotation of said driven shaft, said impeller, turbine member and casing being rotatable relative to each other, means for selectively locking said casing against rotation.

4. A reversible rotary hydraulic coupling comprising axially fixed drive and driven shafts mounted for rotation relative to each other, an impeller carried by said drive shaft for rotation therewith, a turbine member carried by said driven shaft for rotation therewith, a casing surrounding said impeller and said turbine member, a reversing vane ring carried by said casing for reversing the direction of flow of fluid circulated by said impeller, said turbine member being mounted for axial movement and including a vane ring selectively positionable in the path of fluid flowing between said impeller and said reversing vane ring and fluid flowing between said reversing vane ring and said impeller to selectively control the direction of rotation of said driven shaft, said casing being mounted in a fixed housing, said driven shaft being rotatably journaled in said housing, a fluid reservoir carried by said housing, a fluid passage through said driven shaft continuously communicated with the interior of said casing, a fluid line continuously communicating said fluid reservoir with said fluid passage, said fluid reservoir gravity feeding said casing.

5. A reversible rotary hydraulic coupling comprising axially fixed drive and driven shafts mounted for rotation relative to each other, an impeller carried by said drive shaft for rotation therewith, a turbine member carried by said driven shaft for rotation therewith, a casing surrounding said impeller and said turbine member, a reversing vane ring carried by said casing for reversing the direction of flow of fluid circulated by said impeller, said turbine member being mounted for axial movement and including a vane ring selectively positionable in the path of fluid flowing between said impeller and said reversing vane ring and fluid flowing between said reversing vane ring and said impeller to selectively control the direction of rotation of said driven shaft, said drive shaft having mounted thereon a flywheel disposed externally of said casing, said casing being restrained against axial movement by said flywheel and said impeller.

References Cited in the file of this patent

UNITED STATES PATENTS

| Number | Name | Date |
|---|---|---|
| 975,795 | Radcliffe | Nov. 15, 1910 |
| 1,298,990 | Mason | Apr. 1, 1919 |
| 2,015,212 | Beaumont | Sept. 24, 1935 |
| 2,352,109 | Leary | June 20, 1944 |
| 2,387,415 | Sibert | Oct. 23, 1945 |
| 2,398,665 | Pietsch | Apr. 16, 1946 |
| 2,534,104 | Chiville | Dec. 12, 1950 |